United States Patent

Adams, Jr.

[15] 3,673,436

[45] June 27, 1972

[54] LATE PHASE FIRING SWITCHING CIRCUIT

[72] Inventor: James R. Adams, Jr., Richfield, Minn.

[73] Assignee: Honeywell Inc., Minneapolis, Minn.

[22] Filed: Jan. 11, 1971

[21] Appl. No.: 105,395

[52] U.S. Cl. ........................307/246, 307/252 B, 307/252 N, 307/262, 307/318, 317/96, 317/148.5 B

[51] Int. Cl. ........................................H03k 17/28, F23q 3/00

[58] Field of Search ...............307/246, 252 B, 252 N, 252 Q, 307/252 T, 252 UA, 252 W, 262, 283, 284, 293, 294, 301, 318; 317/96, 148.5 B; 323/22 SC

[56] References Cited

UNITED STATES PATENTS

| | | | |
|---|---|---|---|
| 3,045,148 | 7/1962 | McNulty et al. | 317/148.5 B |
| 3,146,392 | 8/1964 | Sylvan | 307/318 X |
| 3,244,965 | 4/1966 | Gutzwiller | 307/301 X |
| 3,381,212 | 4/1968 | Peltola et al. | 307/252 T X |
| 3,360,713 | 12/1967 | Howell | 307/252 B X |
| 3,392,626 | 7/1968 | Miller et al. | 307/252 B |
| 3,457,456 | 7/1969 | Dietz | 317/96 X |
| 3,466,502 | 9/1969 | Pinckaers | 307/252 W X |
| 3,488,132 | 1/1970 | Fairley et al. | 307/252 N X |

*Primary Examiner*—Donald D. Forrer
*Assistant Examiner*—L. N. Anagnos
*Attorney*—Lamont B. Koontz and Alfred N. Feldman

[57] ABSTRACT

A control system is provided for energizing an electrical load, in the form of a spark ignition transformer, so that the load is energized for a portion of a half wave of the applied alternating current voltage. The control circuit utilizes a capacitor in series with the primary winding of a pulse transformer with this combination paralleled by a Zener diode for triggering a solid state switch such as a Triac or silicon controlled rectifier. The capacitor is charged through the pulse transformer primary by the applied alternating current voltage during the early or rising portion of the applied wave form causing a pulse of the wrong polarity to be applied to the gate of the silicon controlled rectifier until the Zener breakdown voltage is reached, at which voltage the capacitor is held charged. When the applied voltage declines to the Zener breakdown potential and the Zener causes to conduct, the capacitor is allowed to discharge through the pulse transformer primary causing a pulse of the proper polarity to trigger the solid state switch that in turn generates a spark through a step-up transformer.

7 Claims, 2 Drawing Figures

INVENTOR.
JAMES R. ADAMS, JR.
BY
Alfred N. Feldman
ATTORNEY.

INVENTOR.
JAMES R. ADAMS, JR.
BY Alfred N. Feldman
ATTORNEY.

LATE PHASE FIRING SWITCHING CIRCUIT

CROSS REFERENCE TO RELATED APPLICATIONS

The present application is an improvement of the U.S. Pat. application Ser. No. 21,570 filed on Mar. 23, 1970 in the name of Balthasar H. Pinckaers and assigned to the assignee of the present invention.

BACKGROUND OF THE INVENTION

The present invention has particular utility in fuel burners where a spark ignition is desired for operation, such as is disclosed in the U.S. Pat. No. 3,380,796 issued on Apr. 30, 1968 to A. D. Kompelien and U.S. Pat. No. 3,488,514 issued on Jan. 6, 1970 to J.E. Lundberg. Both of the above-noted United States patents disclose fuel burner systems that utilize ignition systems different than that disclosed in the present application but the circuit of the present application could be readily adapted to be used in the type of circuit disclosed in these two patents.

When circuits for firing solid state power switches, such as the silicon controlled rectifier and Triac, are applied to step-up transformer for spark ignition, a problem arises in controlling the power to the primary of the transformer in order to make the transformer design practical. As a result of this, it is desired to be able to apply only a selected amount of power to the primary for a short period of time and this requires phased firing of a silicon controlled rectifier or Triac only for a selected portion of the applied voltage. In order to accomplish this, a circuit must be provided which is capable of disregarding the initial rise of the applied wave form, but this is quite difficult as most circuits are responsive to the voltage and therefore are not directly applicable to this type of control.

SUMMARY OF THE INVENTION

The present invention is directed to a phase-firing circuit that is capable of ignoring or disregarding the rising voltage portion of the applied wave form to a power switch, such that a silicon controlled rectifier or Triac, yet which responds to a predetermined voltage which occurs after the peak of the wave form. This is accomplished by providing a pulse transformer with a primary in series with a capacitor that is paralleled by a Zener diode so that the capacitor can be charged on the rising portion of the applied wave form until the Zener breakdown voltage is reached, the capacitor voltage being held at that level until the applied voltage falls. When the voltage falls to the Zener diode voltage, the capacitor is allowed to discharge through the primary of the pulse transformer to generate a pulse of the proper polarity to operate the silicon controlled rectifier or Triac late in the applied wave form. When the voltage falls sufficiently to drop below the Zener breakdown potential, the discharge of the capacitor through the pulse transformer primary is rapid enough to generate a pulse of the proper polarity to trigger the silicon controlled rectifier or Triac into conduction. The silicon controlled rectifier or Triac conducts until the applied voltage falls to zero and then is automatically extinguished. This sequence is repetitively followed on each half cycle, in one version shown, or on alternate half cycles on a second version shown, thereby delivering a well-defined small quantity of electrical energy to the primary of a spark igniter type of transformer. Moreover, this happens at a well-defined value of supply voltage after the peak value of the supply voltage has passed.

DESCRIPTION OF THE PREFERRED EMBODIMENTS

Figure 1:
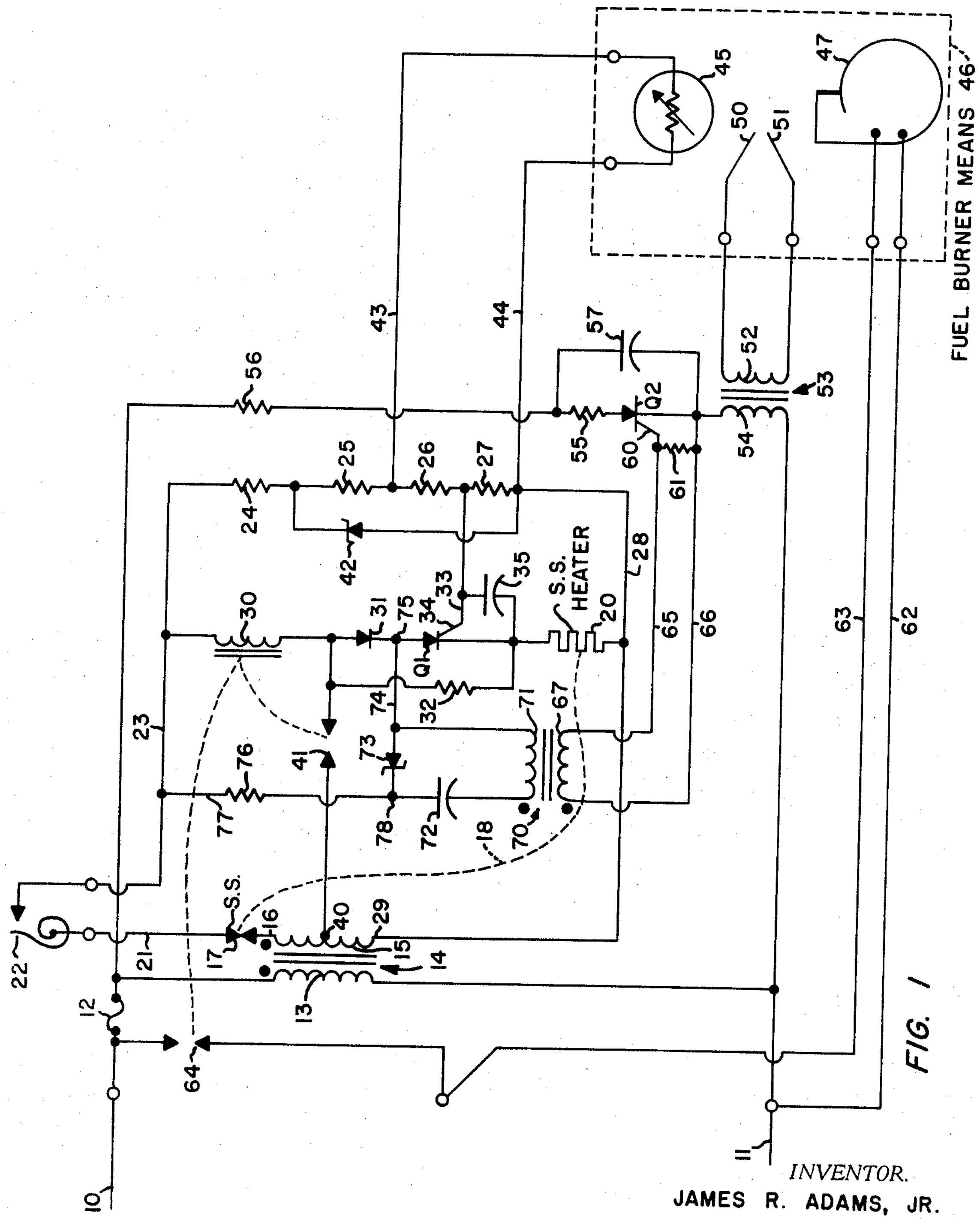
FIG. 1 is a schematic representation of a fuel burner and a complete solid state electronic control system therefor, and including the novel switching circuit means for generation of the necessary ignition spark.

In FIG. 1 a complete fuel burner control system incorporating the novel switching circuit means is disclosed. Conventional alternating current is supplied between conductors 10 and 11 through a fuse 12 and the primary winding 13 of a control or step-down transformer 14. The transformer 14 has a tapped secondary winding 15 with one end 16 connected through a safety switch contact 17 that is coupled mechanically at 18 to a safety switch heater 20, the function of which will be described subsequently.

The safety switch contact 17 is connected at 21 through a conventional thermostat 22 to a conductor 23 that supplies power to a voltage divider network made up of resistors 24, 25, 26, and 27. The resistor 27 is connected to a conductor 28 that returns to the side 29 of the tapped secondary winding 15 of transformer 14. The voltage supplied between conductors 23 and 28 is also available through a relay 30 that is in series with a diode 31 that is used to block a reverse current path (that will be described subsequently in the operation of the device) along with the silicon controlled rectifier Q1 and the safety switch heater 20. A biasing resistor 32 is connected across the diode 31 and the silicon controlled rectifier Q1 to provide a bias circuit in conjunction with a voltage developed across the voltage divider network 24, 25, 26, and 27, which is in turn connected by conductor 33 to the gate 34 of the silicon controlled rectifier Q1. A transient suppressing condenser 35 is provided in the gate circuit of the silicon controlled rectifier Q1.

The transformer secondary winding 15 has a tap 40 that is connected through a relay contact 41 of the relay 30 to the juncture of the relay 30 and diode 31, and is used to lock the relay in an energized condition when the circuit is energized. Also associated with the overall control circuit is a Zener diode 42 in the voltage divider network made up of resistors 24, 25, 26, and 27, and this Zener diode is used for stabilizing the voltage in the gate circuit of the silicon controlled rectifier Q1. The resistors 26 and 27 are paralleled through conductors 43 and 44 by a photoresponsive resistor 45, that has a relatively high resistance in the absence of a flame, in the fuel burner means 46. The fuel burner means 46 includes at 47 a burner member such as a valve and a blower for admission of oil to the fuel burner means and oil is ignited by a spark across electrodes 50 and 51 when a sufficient voltage is applied at the secondary winding 52 of a spark generating transformer 53. A primary winding 54 is provided in series with a second silicon controlled rectifier Q2 which has an anode to cathode circuit that includes the primary winding 54 along with a resistor 55 and a further resistor 56 which places the primary winding 54 across the alternating current voltage supply between conductors 10 and 11. A transient suppression capacitor 57 is supplied across the silicon controlled rectifier Q2 and resistor 55, in a conventional manner, and a gate 60 is provided for the silicon controlled rectifier Q2. The silicon controlled rectifier Q2 can be considered as a power switch means having a control means for operating the switch means. The operation is accomplished by providing a voltage of the proper polarity across the resistor 61 that is in the gate to cathode circuit of the silicon controlled rectifier Q2. The manner in which the voltage is supplied and its polarity is where the novelty of the present invention lies.

In order to complete the circuitry for the fuel burner means 46, a pair of conductors 62 and 63 are provided wherein conductor 62 is connected to the conductor 11 for supplying line voltage and conductor 63 is provided through a relay contact 64 that is operated by relay 30 connect the other side of the fuel burner means 46 to the alternating current voltage source.

The mechanism for generating a spark across electrodes 50 and 51 by means of the spark transformer 53 revolves around the mode of causing the silicon controlled rectifier Q2 to be fired. This is accomplished by the voltage supplied on conductors 65 and 66 from the secondary winding 67 of a pulse transformer 70. A primary winding of the pulse transformer 70 is shown at 71 and is connected to an energy storage means 72 in the form of a capacitor. The energy storage means 72 and primary winding means 71 are paralleled by a Zener diode or voltage breakdown means 73. A conductor 74 connects the junction of the Zener diode 73 and the primary winding 71 to the junction 75 between the diode 31 and the silicon controlled rectifier Q1. A resistor 76 and conductor 77 are provided to connect the junction 78 between the voltage breakdown means 73 and the energy storage means 72 to the conductor 23 where voltage is supplied and through which a discharge means is supplied for discharging the energy stored in the capacitor 72, as will be brought out in the description of the operation of the overall circuit.

OPERATION OF FIGURE 1

When it is desired to put the fuel burner means 46 into operation, energy of an alternating current voltage type is supplied on conductors 10 and 11. Current flows through the step-down transformer 14 to energize the control in general. Upon the closing of the thermostat 22, a complete circuit is provided from the secondary winding 15 through the safety switch 17 and the thermostat 22 to the conductor 23. The voltage divider made up of resistors 24, 25, 26 and 27 provides a bias signal on the gate 34 of the silicon controlled rectifier Q1. If the photocell 45 is dark, its resistance is high and sufficient voltage is developed in the gate circuit of the silicon controlled rectifier Q1 to cause the silicon controlled rectifier to immediately go into conduction upon a positive application of voltage on conductor 23. The operation of the silicon controlled rectifier Q1 causes current to flow through the relay 30 and the diode 31, thereby energizing the relay 30 which immediately closes contact 41 and latches the relay into an energized condition. The contact 64 of the relay 30 is also closed thereby supplying an energizing voltage to the fuel burner means 46 to actually energize the burner mechanism 47 to admit a combustible fuel to the electrodes 50 and 51.

At the same time as the voltage starts to rise on conductor 23 of the system for operation of the relay 30, current flows through conductor 77 and resistor 76 to begin charging the capacitor 72 through the primary winding 71 and back through the conductor 74 and junction 75 so that the charge current flows through the silicon controlled rectifier Q1. The current flowing through the primary winding 71 in the pulse transformer 70 causes a current to be produced in the secondary winding 67 and in turn places a voltage across the gate to cathode resistor 61 of the silicon controlled rectifier Q2 whose polarity is such that the gate 60 is negatively biased with respect to the cathode and the silicon controlled rectifier Q2 will not conduct. As the voltage across the capacitor 72 approaches the breakdown voltage of Zener diode 73, the Zener diode begins to conduct and does not allow the capacitor to charge further. This occurs on the rising portion of the applied alternating current voltage. The Zener diode 73 holds the voltage across the capacitor constant at the breakdown potential until the voltage starts to fall at about 130° of the normal 360° applied voltage wave form. Then the voltage drops on conductor 23 to a sufficiently low point so that the Zener diode 73 no longer conducts current. The capacitor 72 then begins to discharge through two different discharge paths. The first discharge path means includes the resistor 76 and the conductor 23 along with the relay 30, the diode 31, and the conductor 74 back to the primary winding 71 of transformer 70. Current also discharges from capacitor 72 through the resistor 76, conductor 77, thermostat 22, safety switch terminal 17 transformer secondary 16, conductor 40 through the closed contact 41 back to the diode 31, the junction 75, and conductor 74 of the switching circuit means. These two discharge paths allow the energy stored in the energy storage means or capacitor 72 to flow through the primary winding 71 of the pulse transformer 70 thereby generating a pulse of energy that is applied on conductors 65 and 66 between the gate 60 and the cathode of the silicon controlled rectifier Q2 whose polarity is such that the gate 60 is positively biased with respect to the cathode of the silicon controlled rectifier Q2.

This proper polarity pulse drives the silicon controlled rectifier Q2 into conduction near the end of the applied alternating current voltage and allows the silicon controlled rectifier to conduct through the spark generating transformer 53 to generate a spark between electrodes 50 and 51. As soon as the voltage falls to zero between conductors 23 and 38, the spark extinguishes and the silicon controlled rectifier Q2 goes out of conduction. On the reverse half cycle nothing occurs. The relay 30 remains energized through the contact 41 from the upper half of the transformer 14 and the system waits for the second rising voltage applied. The rising voltage again causes a spark to be generated along the lines previously outlined until the flame is established at the fuel burner means 46 and sensed by the photocell 45. The resistance of a photocell immediately drops to a very low value thereby reducing the voltage in the gate 34 of the silicon controlled rectifier Q1 and turning the silicon controlled rectifier Q1 to an "off" condition thereby stopping the current flow through the safety switch heater 20. The silicon controlled rectifier Q1 was also the path needed for the charging of the capacitor 72 in the spark generating or switching circuit means. Diode 31 prevents a sneak charge path for capacitor 72 when the silicon controlled rectifier is "off." Since the switching circuit means no longer has a charging path for the capacitor 72, it becomes inoperative and the spark is no longer generated across electrodes 50 and 51 since there is no gating pulse at gate 60 of the silicon controlled rectifier Q2.

When the system is to be shut down, the thermostat 22 opens thereby removing the alternating current voltage from the relay 30, opening the contacts 41 and 64 thereby removing the fuel burner means 46 from operation and removing all the voltage from the switching circuit means.

Figure 2:
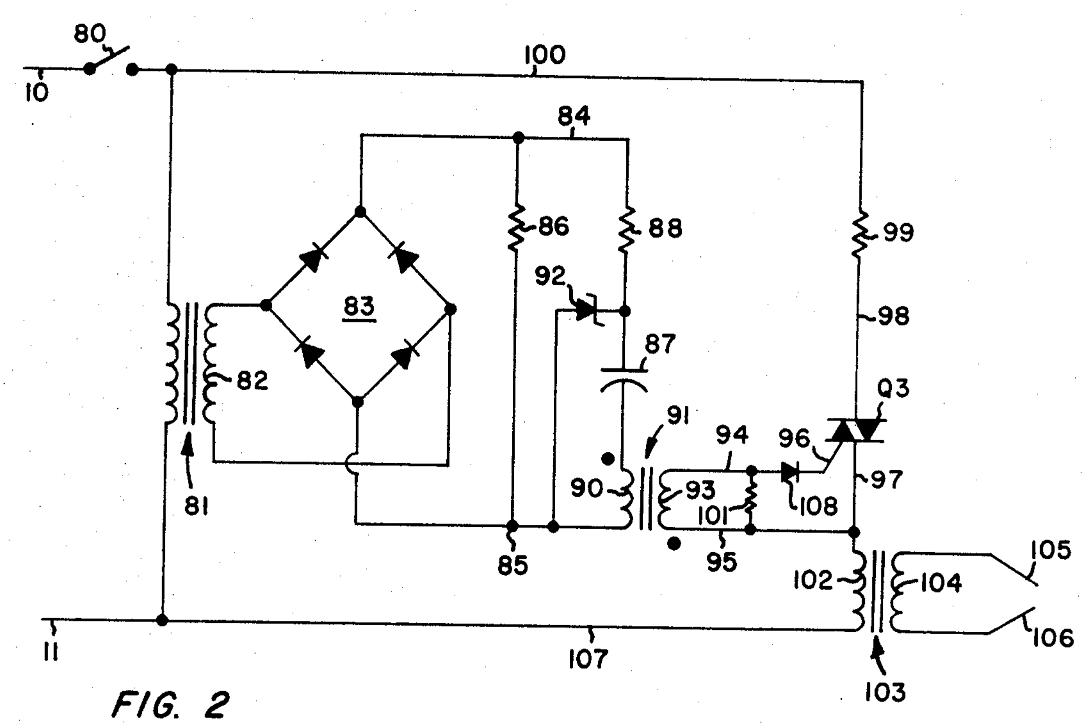
FIG. 2 is a disclosure of a second embodiment of only the spark generating section of the present invention.

In FIG. 2 another version of the switching circuit means alone is disclosed. The alternating current voltage source conductors 10 and 11 are again provided through a switch 80 to a step-down transformer generally shown at 81. The secondary winding 82 of the step-down transformer is connected to a conventional bridge shown at 83 which causes a rectified full-wave pulsating voltage to be developed between conductors 84 and 85. A resistor 86 is provided as part of the discharge path means for an energy storage means 87 which is connected by resistor 88 and a primary winding 90 of a pulse generating transformer 91 between the conductors 84 and 85. A voltage breakdown means or Zener diode 93 is provided across the energy storage means or capacitor 87 and the transformer means primary 90 of the pulse transformer 91. A secondary means 93 is connected across conductors 94 and 95 through a diode 108 to the gate 96 and one side 97 of a Triac Q3 which has its other side 98 connected through resistor 99 to a conductor 100 which in turn is connected back to the switch 80 and through the switch to the source on conductor 10. A resistor 101 is connected between the conductor 94 of the pulse transformer secondary 93 and the side 97 of the Triac Q3 which in turn is connected to a primary winding 102 of a spark generating transformer generally shown at 103 and having a secondary winding 104. A blocking diode 108 is placed in the gate circuit of Triac Q3. A pair of spark electrodes 105 and 106 are disclosed. The primary winding 102 is connected by conductor 107 to conductor 11 of the power source to complete the components of the circuit of FIG. 2.

OPERATION OF FIGURE 2

When the switch 80 is closed applying power from conductors 10 and 11 to the transformer means 81, the secondary winding 82 provides an output on conductors 84 and 85 which is a rising and falling full wave rectified but unfiltered voltage. As the voltage between conductors 84 and 85 rises, current flows through the resistor 88 to charge the capacitor 87 through the primary 90 to the conductor 85. This rising voltage provides a trigger voltage through the transformer 91 which is of such polarity that it is blocked from Triac Q3 by diode 108 and is shunted completely through resistor 101. As soon as the breakdown voltage of the breakdown means or Zener diode 92 is reached, the current flowing in resistor 88 bypasses the energy storage means 87 until the voltage begins to fall. On the falling portion of the voltage applied to this network, the voltage breakdown means 92 continues to conduct until its breakdown potential has been reached. When its breakdown potential is reached, it ceases to conduct, and the energy storage means or capacitor 87 begin to discharge through a discharge path means which includes the resistor 88, conductor 84, resistor 86, conductor 85, and the primary of the pulse transformer 91. This discharge allows a pulse to pass through the pulse transformer 91 which is of the proper polarity to pass through diode 108 and to provide a trigger pulse on the gate 96 of the Triac Q3 to cause the Triac Q3 to go into conduction. With the Triac Q3 in conduction current flows through the primary winding 102 of the spark ignition transformer 103 thereby generating the spark between the electrodes 105 and 106. When the applied voltage falls to zero, the Triac Q3 goes out of conduction and waits for the next half cycle to repeat its operation.

The circuit of FIG. 2 provides a spark between electrodes 105 and 106 for each half cycle of the applied wave form as opposed to the circuit of FIG. 1 where a spark was generated for every other half cycle of the applied wave form. The circuitry of FIG. 2 could be incorporated into the circuit of FIG. 1 if the additional sparking on every half cycle was desired. Many other variations of the circuit arrangement and novel idea of charging the capacitor on the rising portion of the applied wave form producing a pulse of one polarity and then discharging it through a conduction path means to a pulse transformer producing a pulse of the opposite polarity could be accomplished by one skilled in the art. The applicant therefore wishes to be limited in the scope of his invention solely to the scope of the appended claims.

The embodiments of the invention in which an exclusive property or right is claimed are defined as follows:

1. Switching circuit means for controlled operation of power switch means after the passing of the peak of an applied alternating current voltage to the power switch means, including: power switch means having control means for operating said switch means; transformer means including primary means and secondary means with said secondary means connected to said control means to control the conduction of a current through said switch means; energy storage means including connection means connecting said primary means to said alternating current voltage to store energy in said energy storage means upon said alternating current voltage rising; voltage breakdown means in parallel circuit with said energy storage means and said primary means; and discharge path means connecting said primary means and said energy storage means to discharge said stored energy upon said alternating current voltage falling below an operating point of said voltage breakdown means to generate a pulse of energy of proper polarity in said transformer means to cause said switch means to become conductive.

2. Switching circuit means for controlled operation of power switch means as described in claim 1 wherein said power switch means is a solid state switch and said control means includes a gate for said solid state switch.

3. Switching circuit means for controlled operation of power switch means as described in claim 2 wherein said energy storage means is a capacitor means and said voltage breakdown means is a Zener diode.

4. Switching circuit means for controlled operation of power switch means as described in claim 3 wherein said energy storage means connection means includes full wave rectifier means and said solid state switch is a Triac.

5. Switching circuit means for controlled operation of power switch means as described in claim 3 wherein said energy storage means connection means includes an impedance and said solid state switch is a silicon controlled rectifier.

6. Switching circuit means for controlled operation of power switch means as described in claim 4 wherein said current which is controllably conducted through said Triac flows in an output circuit which includes a primary winding of a step-up transformer having a secondary winding adapted to be connected to a pair of electrodes forming a spark gap for ignition of a combustible fuel.

7. Switching circuit means for controlled operation of power switch means as described in claim 5 wherein said current which is controllably conducted through said silicon controlled rectifier flows in an output circuit which includes a primary winding of a step-up transformer having a secondary winding adapted to be connected to a pair of electrodes forming a spark gap for ignition of a combustible fuel.

* * * * *